US011340467B2

(12) United States Patent
Gregg et al.

(10) Patent No.: US 11,340,467 B2
(45) Date of Patent: May 24, 2022

(54) OPTICAL FIBER FOR GENERATING ROTARY OPTICAL BEAMS

(71) Applicant: Lumentum Operations LLC, San Jose, CA (US)

(72) Inventors: Patrick Gregg, Santa Clara, CA (US); Richard D. Faulhaber, San Carlos, CA (US); Martin H. Muendel, Oakland, CA (US); Vincent Petit, Cupertino, CA (US); James J. Morehead, Oakland, CA (US)

(73) Assignee: Lumentum Operations LLC, San Jose, CA (US)

( * ) Notice: Subject to any disclaimer, the term of this patent is extended or adjusted under 35 U.S.C. 154(b) by 0 days.

(21) Appl. No.: 16/860,476

(22) Filed: Apr. 28, 2020

(65) Prior Publication Data

US 2021/0255469 A1    Aug. 19, 2021

Related U.S. Application Data

(60) Provisional application No. 62/978,037, filed on Feb. 18, 2020.

(51) Int. Cl.
*G02B 27/09* (2006.01)
*G02B 6/02* (2006.01)

(52) U.S. Cl.
CPC ......... *G02B 27/0994* (2013.01); *G02B 6/021* (2013.01); *G02B 6/02042* (2013.01)

(58) Field of Classification Search
None
See application file for complete search history.

(56) References Cited

U.S. PATENT DOCUMENTS

| | | | | |
|---|---|---|---|---|
| 7,424,193 | B2 * | 9/2008 | Galvanauskas .... | G02B 6/02042 385/123 |
| 10,429,584 | B2 | 10/2019 | Muendel et al. | |
| 2017/0299806 | A1 * | 10/2017 | Kopp ................. | G02B 6/02042 |
| 2017/0370704 | A1 * | 12/2017 | Froggatt ............ | G01D 5/35354 |
| 2018/0088358 | A1 * | 3/2018 | Kliner ............... | G02B 6/02042 |
| 2018/0143377 | A1 * | 5/2018 | Muendel ............. | G02B 6/2726 |
| 2019/0317280 | A1 | 10/2019 | Muendel et al. | |

OTHER PUBLICATIONS

U.S. Appl. No. 16/703,723 for a "Rotary Optical Beam Generator" filed Dec. 4, 2019.
U.S. Appl. No. 16/573,814 for "Tapered Non-Concentric Core Fibers" filed Sep. 17, 2019.

* cited by examiner

*Primary Examiner* — Tina M Wong
(74) *Attorney, Agent, or Firm* — Harrity & Harrity, LLP

(57) ABSTRACT

An optical fiber may include a first core, a second core, and a cladding surrounding the first core and the second core. The second core may be at an off-center location with respect to a center of the optical fiber, or the second core may include an azimuthally nonuniform section at the off-center location. The second core may twist about an axis of the optical fiber along a length of the optical fiber, and the second core being twisted about the axis may cause an optical beam, launched into the second core at a first end of the optical fiber, to be at least partially converted to a rotary optical beam at a second end of the optical fiber.

24 Claims, 6 Drawing Sheets

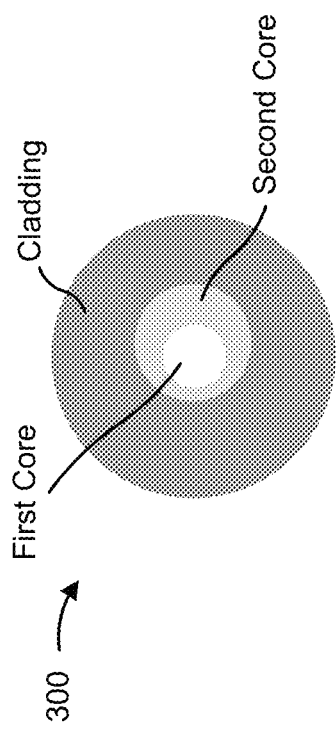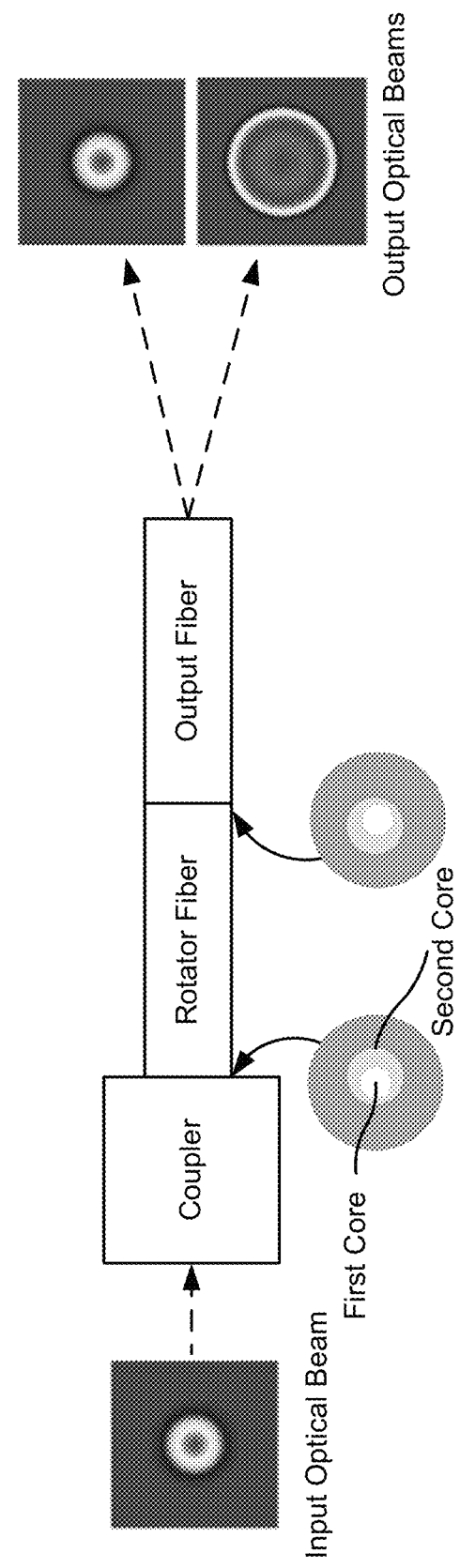

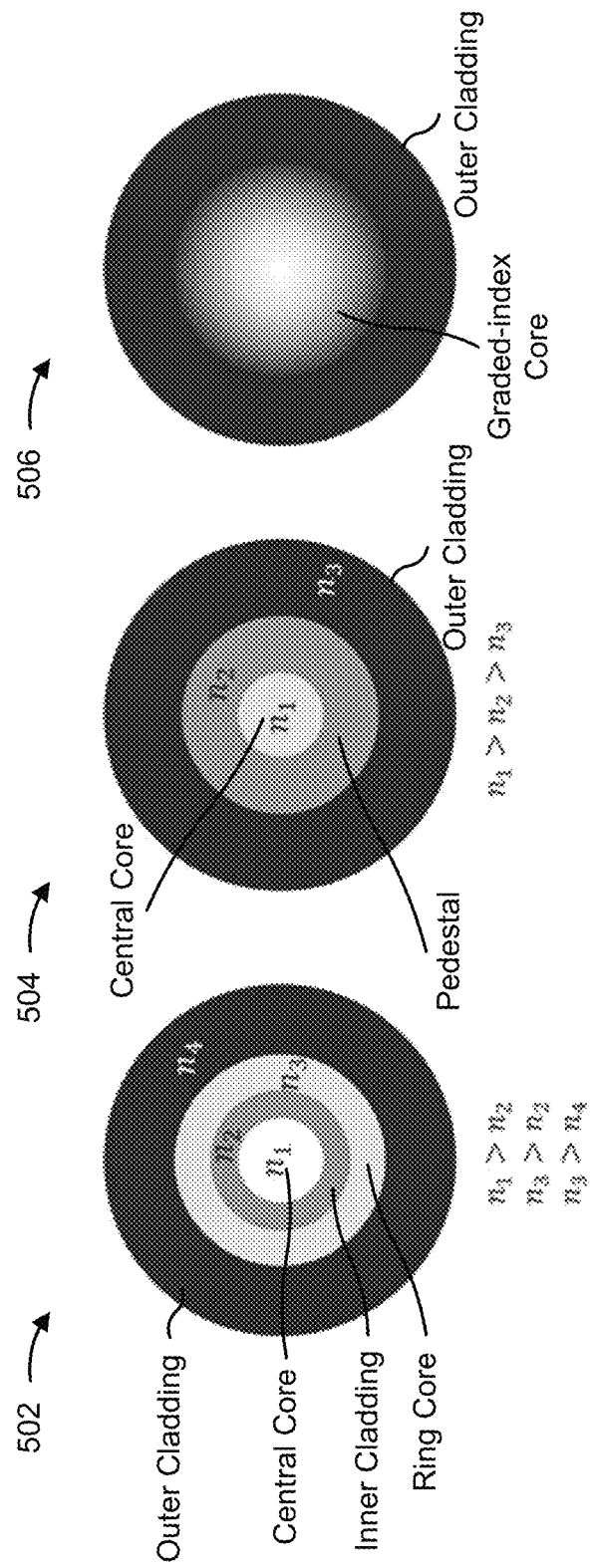

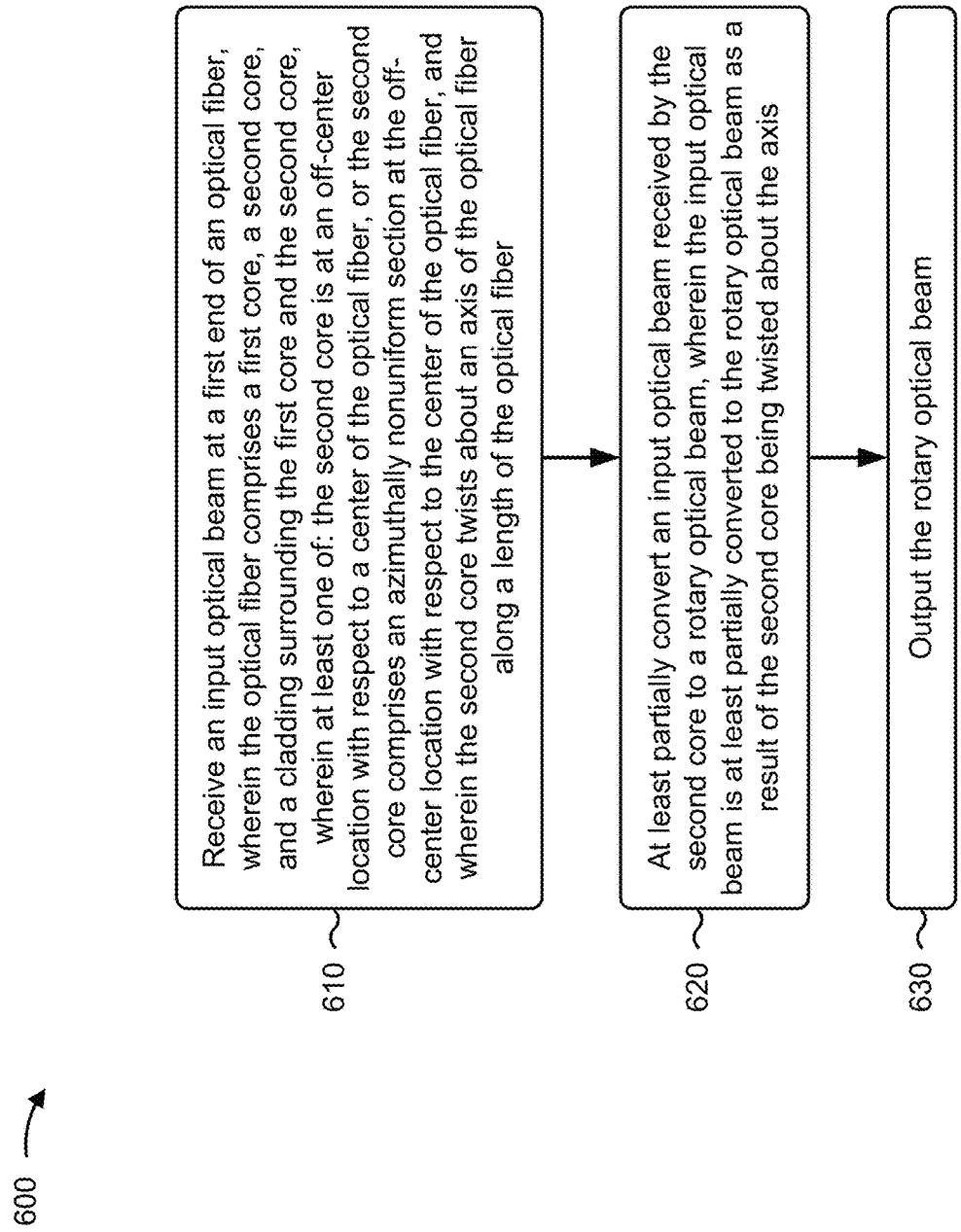

OPTICAL FIBER FOR GENERATING ROTARY OPTICAL BEAMS

RELATED APPLICATION

This application claims priority to U.S. Provisional Patent Application No. 62/978,037, for "FIBER FOR VARIABLE ROTARY BEAM GENERATION," filed on Feb. 18, 2020, the content of which is incorporated by reference herein in its entirety.

TECHNICAL FIELD

The present disclosure relates generally to optical fibers and to an optical fiber for generating rotary optical beams.

BACKGROUND

A beam profile of an optical beam has a significant impact on processing performance associated with material processing performed using the optical beam. For example, an optical beam with an annular beam profile can enable superior metal cutting (e.g., by a laser cutting system). However, beam profiles of most fiber-delivered optical beams are relatively simplistic. For example, the beam profile may be a Gaussian or near-Gaussian profile for a low-beam-parameter-product (BPP) laser (e.g., a BPP of less than or equal to approximately 3 millimeters times milliradians (mm-mrad)) that can be used for processing thin sheet metal (e.g., sheet metal with a thickness of less than or equal to approximately 3 mm) using a tightly focused optical beam. As another example, the beam profile may be a top-hat (sometimes referred to as a flattop) profile for a high BPP laser (e.g., a BPP of greater than approximately 3 mm-mrad) that can be used for processing thick sheet metal (e.g., sheet metal with a thickness greater than approximately 3 mm) using a larger beam.

SUMMARY

According to some implementations, an optical fiber may include a first core; a second core, wherein at least one of: the second core is at an off-center location with respect to a center of the optical fiber, or the second core comprises an azimuthally nonuniform section at the off-center location with respect to the center of the optical fiber, wherein the second core twists about an axis of the optical fiber along a length of the optical fiber, and wherein the second core being twisted about the axis is to cause an optical beam, launched into the second core at a first end of the optical fiber, to be at least partially converted to a rotary optical beam at a second end of the optical fiber; and a cladding surrounding the first core and the second core.

According to some implementations, a beam generator may include an optical fiber comprising: a first core; a second core, wherein at least one of: the second core is at an off-center location with respect to a center of the optical fiber, or the second core comprises an azimuthally nonuniform section at the off-center location with respect to the center of the optical fiber, wherein the second core twists about an axis of the optical fiber along a length of the optical fiber, and wherein the second core being twisted about the axis is to cause an optical beam, launched into the second core at a first end of the optical fiber, to be at least partially converted to a rotary optical beam at a second end of the optical fiber, and a cladding surrounding the first core and the second core; a coupler to provide, at the first end of the optical fiber, an input optical beam to at least one of the first core of the optical fiber or the second core of the optical fiber; and an output fiber to receive, from the second end of the optical fiber, the rotary optical beam and to generate, based on the rotary optical beam, an optical output.

According to some implementations, a method may include receiving, by an optical fiber, an input optical beam at a first end of the optical fiber, wherein the optical fiber comprises a first core, a second core, and a cladding surrounding the first core and the second core, wherein at least one of: the second core is at an off-center location with respect to a center of the optical fiber, or the second core comprises an azimuthally nonuniform section at the off-center location with respect to the center of the optical fiber, and wherein the second core twists about an axis of the optical fiber along a length of the optical fiber; at least partially converting, by the optical fiber, an input optical beam received by the second core to a rotary optical beam, wherein the input optical beam is at least partially converted to the rotary optical beam as a result of the second core being twisted about the axis; and outputting, by the optical fiber, the rotary optical beam.

BRIEF DESCRIPTION OF THE DRAWINGS

FIG. 3A is a diagram of an example implementation of a cross-section of an optical fiber described herein.

FIG. 3B is a diagram of an example implementation of a beam generator including an optical fiber having a cross-section as shown in FIG. 3A described herein.

FIGS. 5A-5C are diagrams of example implementations of output fibers described herein.

FIG. 6 is a flow chart of an example processes relating to generating a rotary optical beam.

DETAILED DESCRIPTION

Figure 1A:
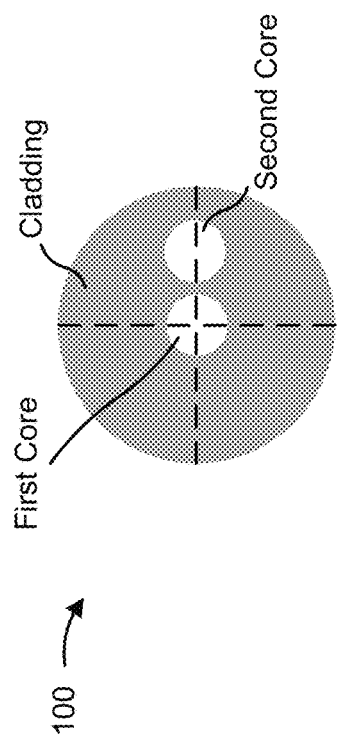
FIG. 1A is a diagram of an example implementation of a cross-section of an optical fiber described herein.

The following detailed description of example implementations refers to the accompanying drawings. The same reference numbers in different drawings may identify the same or similar elements.

As described above, beam shapes of conventional fiber-delivered optical beams are relatively simplistic (e.g., having a Gaussian or near-Gaussian profile, a top-hat profile, and/or the like). Generating an optical beam with a comparatively more advanced beam shape, such as an annular beam shape (i.e., a ring-shaped beam) generally takes expensive, specialized, alignment-sensitive free-space optics, such as axicons, spiral phase plates, and/or the like. Moreover, such optics typically need to be located in a processing head, distal to a fiber associated with delivering the optical beam. The processing head is an opto-mechanical assembly that is subject to acceleration and contamination (e.g., from smoke, metal debris, dust, and/or the like), and is therefore an undesirable location for expensive, alignment-sensitive, bulky, and/or heavy optical elements.

Further, conventional techniques for generating an optical beam with an annular beam shape in an all-fiber architecture typically provide an optical beam with poor beam quality. For example, the conventional techniques may generate an optical beam with an excessively high BPP, an excessive amount of power in a middle of the annulus, diffuse beam edges (e.g., with a relatively long radial tail of power that causes poor processing quality), a beam which remains annular only for a very short propagation distance before deteriorating, and/or the like.

Some implementations described herein provide an optical fiber for generating an optical beam with an annular beam shape directly in the optical fiber (i.e., without any free-space optics). For example, the generated optical beam may be a rotary optical beam (e.g., an optical beam that propagates in the optical fiber along a helical trajectory), thereby generating an optical beam with an annular beam shape. In some implementations, the rotary character of the optical beam can be preserved (e.g., when the optical beam exits the optical fiber) such that a laser spot projected from the optical fiber onto a workpiece, for example, shows an annular beam profile with sharp edges and high beam quality. In this way, an optical beam with an annular beam shape may be generated directly in the optical fiber, thereby facilitating improved material processing.

In some implementations, an optical fiber may include multiple guiding regions, where the guiding regions generate different shapes of optical beams, such as a simplistic beam shape as described above, an annular beam shape, and/or the like. For example, an input optical beam may be provided to one guiding region to generate an output optical beam having a first shape or to another guiding region to generate another output optical beam having a second shape. In some implementations, the optical fiber may include multiple guiding regions for generating rotary optical beams, where each rotary optical beam has a different annular beam shape. In this way, the optical fiber may generate output optical beams having different shapes for different applications (e.g., processing different materials, processing different thicknesses of materials, and/or the like).

FIG. 1A is a diagram of an example implementation of a cross-section 100 of an optical fiber described herein. As shown in FIG. 1A, an optical fiber for generating a rotary optical beam (also referred to herein as a rotator fiber) may include a first core and a second core, where the second core is at an off-center location with respect to a center of the optical fiber. As shown in FIG. 1A, the first core may be located at a center of the optical fiber (e.g., as shown by the intersection of the dashed lines), and the second core may be located at an off-center location with respect to the center of the optical fiber. As also shown in FIG. 1A, the optical fiber may include a cladding that surrounds the first core and the second core.

In some implementations, and as shown by the shading in FIG. 1A, the first core and the second core may have the same refractive index. In other implementations, the first core and the second core may have different refractive indices. Additionally, or alternatively, the first core and/or the second core may have refractive indices that are greater than a refractive index of the cladding. In this way, the first core may form a first guiding region for propagating light along a length of the optical fiber, and the second core may form a second guiding region for propagating light along the length of the optical fiber.

Figure 1B:
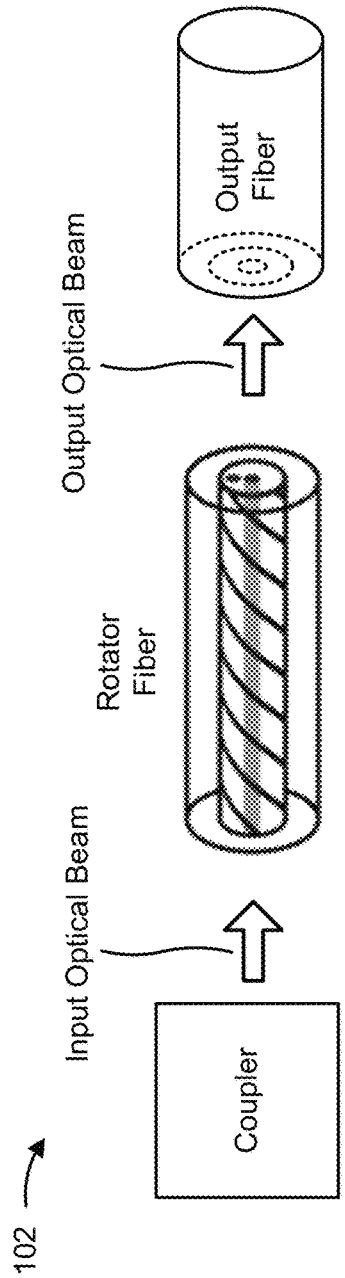
FIG. 1B is a diagram of an example implementation of a beam generator including an example implementation of an optical fiber having a cross-section as shown in FIG. 1A described herein.

FIG. 1B is a diagram of an example implementation of a beam generator 102 including an example implementation of an optical fiber (e.g., a rotator fiber) having a cross-section 100 as shown in FIG. 1A. As shown in FIG. 1B, the second core may twist about an axis of the rotator fiber (e.g., a center of the rotator fiber) along a length of the rotator fiber. In some implementations, the first core may also twist about the axis of the rotator fiber, but, because the first core is located at the center of the rotator fiber in FIGS. 1A-1C, the first core may not visibly show such a twist. Thus, a refractive index profile of the rotator fiber (e.g., defined by the refractive indices of the first core, the second core, and the cladding) may rotate along the length of the rotator (e.g., with a period), where a transverse center of rotation is identified by a center of the cladding as shown by the intersection of the dashed lines in FIG. 1A. In some implementations, the second core being twisted about the axis may cause an input optical beam (e.g., a non-rotary optical beam), launched at an input end of the rotator fiber, to be at least partially converted to a rotary optical beam at an output end of the rotator fiber, as described in further detail below.

As shown in FIG. 1B, in some implementations, the rotator fiber may be disposed between a coupler and an output fiber. In some implementations, the rotator fiber and the output fiber may be fusion-spliced together (e.g., using a fiber fusion splicing technology).

As shown in FIG. 1B, the beam generator 102 may include the coupler for providing the input optical beam to the rotator fiber. In some implementations, the coupler may be an active device that may receive an input optical beam and direct the input optical beam and/or fractions of the input optical beam to one or more cores and/or guiding regions. For example, the coupler may mechanically move an input optical beam in free space to couple, selectively, into different guiding regions, by moving a lens, tilting a mirror, and/or the like. Additionally, or alternatively, the coupler may use mechanical and/or opto-mechanical beam steering within an optical fiber, such as bending a graded-index optical fiber, bending an optical fiber carrying a laterally expanded beam, bending and/or twisting an optical fiber carrying a defined polarization mode or modes, and/or the like. In some implementations, the coupler may use non-mechanical beam steering such as acousto-optic, electro-optic, polarization-based, and/or thermal modulators, in free space and/or inserted monolithically between an input fiber and the rotator fiber (e.g., using bonding, splicing, and/or the like).

Additionally, or alternatively, the coupler may be a passive device that may receive multiple input optical beams and may couple each of the input optical beams to one of the guiding regions of the rotator fiber. Such multiple input beams may be, for example, generated by multiple lasers, each of which may be controlled independently to generate a desired power level in each of the guiding regions of the rotator fiber.

In some implementations, the coupler may provide, at a first end of the rotator fiber, an input optical beam (e.g., an optical input) to the first core of the rotator fiber and/or the second core of the rotator fiber. For example, the coupler may receive the input optical beam from an input fiber and/or a laser and may provide the input optical beam to the first end of the rotator fiber. In some implementations, the input optical beam may include light propagating in one or more non-rotary guided modes.

In some implementations, when the coupler provides the input optical beam to the first core of the rotator fiber, the input optical beam may pass through the first core of the rotator fiber, and the rotator fiber may generate an output optical beam that is not a rotary optical beam. For example, the output optical beam may have the same or similar characteristics to the input optical beam (e.g., light propagating in one or more non-rotary guided modes) because the refractive index profile of the first core is rotationally uniform with respect to the axis of rotation. In some implementations, although the output optical beam generated by the first core is not a rotary optical beam, the input optical beam may experience circular birefringence while passing through the first core.

In some implementations, when the coupler provides the input optical beam to the second core of the rotator fiber, as the light propagates through the rotator fiber, and due to the twist of the second core along the length of the rotator fiber, the rotator fiber generates a rotary optical beam from the input optical beam. In other words, the rotator fiber, with the second core, may at least partially convert the input optical beam to a rotary optical beam (e.g., by at least partially converting one or more non-rotary guided modes to at least one rotary guided mode). Thus, the output optical beam may include light propagating in at least one rotary guided mode and/or at least one rotary leaky wave. In some implementations, due to the light propagating in the at least one rotary guided mode and/or the at least one rotary leaky wave, the rotary optical beam may have an annular beam shape. The rotary optical beam may be launched via the output fiber (e.g., for use in material processing, such as metal cutting).

In some implementations, the coupler and/or the beam generator 102 may be controlled to provide the input optical beam to the first core or the second core of the rotator fiber. For example, if an application uses a non-rotary optical beam, the coupler and/or the beam generator 102 may be controlled to provide the input optical beam to the first core such that the rotator fiber generates an output optical beam that is not a rotary optical beam. As another example, if an application uses a rotary optical beam, the coupler and/or the beam generator 102 may be controlled to provide the input optical beam to the second core such that the rotator fiber generates an output optical beam that is a rotary optical beam.

In this way, the beam generator 102 including the coupler and the rotator fiber may be controlled to provide, based on an intended application of the output optical beam, one of multiple types of output optical beams. Stated differently, the beam generator 102 may excite (e.g., on demand) different rotary optical beams leaving a single rotator fiber by directing light (e.g., using the coupler) to different guiding regions (e.g., the first core, the second core, and/or the like). In some implementations, the rotator fiber may be referred to as a multi-rotary fiber because the rotator fiber includes at least two guiding regions, which are affected by different magnitudes of rotation, and which, when excited and/or illuminated by an input optical beam, may generate output optical beams of different sizes, divergences, and senses of rotation at an output end of the rotator fiber.

As shown in FIG. 1B, the output fiber may receive, from the rotator fiber, the output optical beam. In some implementations, and as described further herein with respect to FIGS. 5A-5C, the output fiber may include a first guiding region to receive an optical beam from the first core of the optical fiber and a second guiding region to receive the rotary optical beam from the second core of the optical fiber.

Figure 1C:
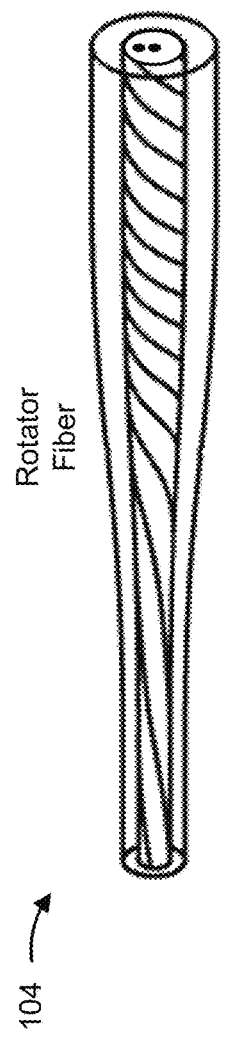
FIG. 1C is a diagram of another example implementation of an optical fiber having a cross-section as shown in FIG. 1A described herein.

FIG. 1C is a diagram of another example implementation 104 of an optical fiber (e.g., a rotator fiber) having a cross-section as shown in FIG. 1A. As shown in FIG. 1C, in some implementations, the rotator fiber may be tapered such that a size of the rotator fiber at a first end of the rotator fiber (e.g., an input end, an end adjacent a coupler, and/or the like) is smaller than a size of the rotator fiber at a second end of the rotator fiber (e.g., an output end, an end spliced to an output fiber, and/or the like).

As also shown in FIG. 1C, a rate of twist at which the second core twists about the optical axis may increase from a first rate of twist (e.g., a twist rate of zero or near zero) toward a first end of the rotator fiber to a second rate of twist toward a second end of the rotator fiber. Such a rotator fiber may generate a rotary optical beam having a uniform shape, power distribution, and/or the like. Although the rotator fiber is illustrated as being straight in FIG. 1C, the rotator fiber may have any shape.

Additionally, or alternatively, although the rotator fiber is illustrated as being tapered in FIG. 1C, the rotator fiber may have an increasing rate of twist (as illustrated), and a diameter of the rotator fiber may not change from the first end to the second end. Such a rotator fiber may generate a rotary optical beam having a uniform shape, power distribution, and/or the like without increasing a size of the output optical beam as compared to a size of the input optical beam.

As indicated above, FIGS. 1A-1C are provided merely as examples. Other examples are contemplated and may differ from what is described with regard to FIGS. 1A-1C. For example, although the cross-sections of the first core and the second core in FIG. 1A have a same shape and a same size, in some implementations, the first core may have a first cross-section and the second core may have a second cross-section, where the first cross-section and the second cross-section have different shapes and/or sizes. For example, the first core may have a circular cross-section, and the second core may have a rectangular cross-section. As another example, the first core and the second core may have circular cross-sections with different radii. Additionally, or alternatively, the first core and the second core may have cross-sections that include other elements and/or sections as described in further detail with respect to FIGS. 3A and 4A-4D.

Figure 2:
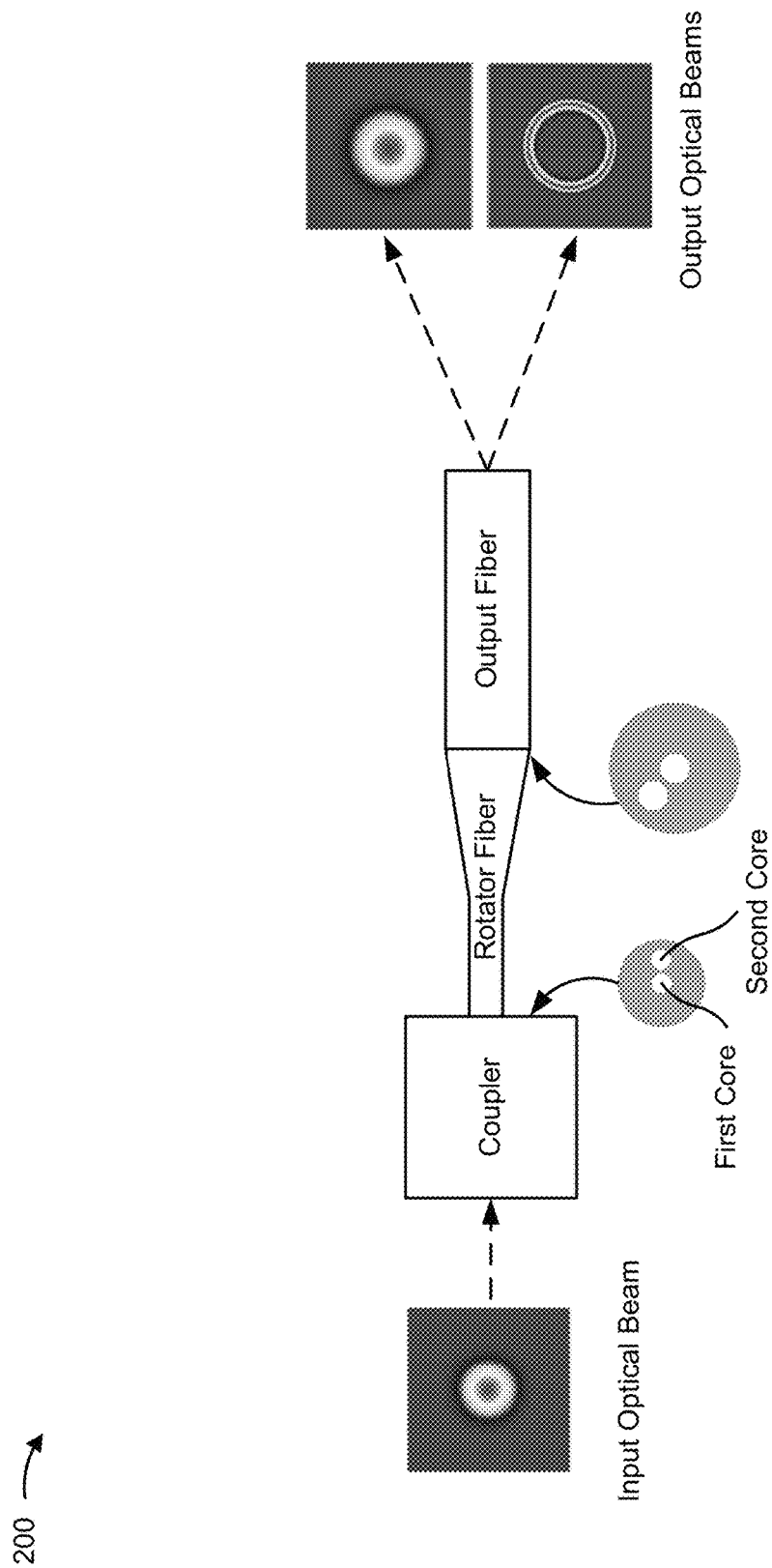
FIG. 2 is a diagram of an example implementation of a beam generator including an optical fiber having a cross-section as shown in FIG. 1A described herein.

FIG. 2 is a diagram of an example implementation of a beam generator 200 including an optical fiber (e.g., a rotator fiber) having a cross-section as shown in FIG. 1A. As shown in FIG. 2, the beam generator 200 may include a coupler, a rotator fiber, and an output fiber. In some implementations, the coupler may receive an input optical beam and provide the input optical beam to the first core or the second core of the rotator fiber.

In some implementations, and as shown in FIG. 2, the rotator fiber may be a tapered rotator fiber (e.g., similar to the rotator fiber as described herein with respect to FIG. 1C). Additionally, or alternatively, the rotator fiber may be a non-tapered rotator fiber (e.g., similar to the rotator fiber as described herein with respect to FIG. 1B).

In some implementations, light from the input optical beam may propagate through the rotator fiber, and the rotator fiber may provide the light to the output fiber. As described herein with respect to FIG. 1C and further described herein with respect to FIGS. 5A-5C, the output fiber may include a first guiding region to receive an optical beam from the first core of the optical fiber and a second guiding region to receive the rotary optical beam from the second core of the optical fiber.

As shown in FIG. 2, the beam generator 200 may generate two types of output optical beams. For example, and as shown in the upper output optical beam of FIG. 2, if the coupler provides the input optical beam to the first core of the rotator fiber, the beam generator 200 may generate an output optical beam having similar characteristics to the input optical beam. As shown in the lower output optical beam of FIG. 2, if the coupler provides the input optical beam to the second core of the rotator fiber, the beam generator 200 may generate an annular and/or rotary optical beam.

As also shown in FIG. 2, the output optical beams may each have a larger diameter than the input optical beam. In some implementations, at least a portion of the increase in diameter of the optical beam (e.g., from the input optical beam to the output optical beams) may be due to an increase in cross-sectional size of the first core and/or the second core along a portion of the length of the rotator fiber. For example, and as shown in FIG. 2, at a first end of the rotator fiber (e.g., an input end, an end adjacent a coupler, and/or the like), the cross-sectional size of the rotator fiber may be smaller than a cross-sectional size of the rotator fiber at a second end of the rotator fiber (e.g., an output end, an end spliced to an output fiber, and/or the like). Similarly, and as also shown in FIG. 2, at a first end of the rotator fiber (e.g., an input end, an end adjacent a coupler, and/or the like), the cross-sectional size of the first core and/or the second core may be smaller than a cross-sectional size of the first core and/or the second core at a second end of the rotator fiber (e.g., an output end, an end spliced to an output fiber, and/or the like)

In some implementations, if the coupler provides the input optical beam to the first core of the rotator fiber, the beam generator 200 may generate an output optical beam having a same size as the input optical beam. For example, a cross-sectional size of the first core at the first end of the rotator fiber may be the same as a cross-sectional size of the first core at the second end of the rotator fiber.

As indicated above, FIG. 2 is provided merely as an example. Other examples are contemplated and may differ from what is described with regard to FIG. 2.

FIG. 3A is a diagram of an example implementation 300 of a cross-section of an optical fiber (e.g., a rotator fiber). As shown in FIG. 3A, the rotator fiber includes a first core, a second core, and a cladding. As also shown in FIG. 3A, the first core may be inserted within the second core such that the second core may surround the first core, and the cladding may surround the second core. In some implementations, and as shown in FIG. 3A, the first core may be located at a center of the rotator fiber.

In some implementations, the second core may be located at an off-center location with respect to the center of the rotator fiber. For example, and as shown in FIG. 3A, a geometric center of the second core may be located at an off-center location with respect to the center of the rotator fiber.

As shown by the shading in FIG. 3A, the first core and the second core may have different refractive indices. In some implementations, a difference between the refractive indices of the first core and the second core may be great enough to prevent light propagating in the first core from entering the second core and/or to prevent light propagating in the second core from entering the first core. In this way, the first core and the second core may provide two separate light propagation paths through the rotator fiber.

In some implementations, the second core may twist about an axis of the rotator fiber (e.g., a center of the optical fiber) along a length of the rotator fiber, as described herein with respect to FIG. 1B, such that an input optical beam (e.g., a non-rotary optical beam), launched at an input end of the rotator fiber, may be at least partially converted to a rotary optical beam at an output end of the rotator fiber. In some implementations, the first core may also twist about the axis of the rotator fiber, but, because the first core is located at the center of the rotator fiber, the first core may not visibly show such a twist. Additionally, or alternatively, the rotator fiber may be tapered as described herein with respect to FIG. 1C.

FIG. 3B is a diagram of an example implementations of a beam generator 302 including an optical fiber (e.g., a rotator fiber) having a cross-section as shown in FIG. 3A. As shown in FIG. 3B, the beam generator 302 may include a coupler, a rotator fiber, and an output fiber. In some implementations, the coupler and the output fiber may be similar to the coupler and the output fiber described herein with respect to FIG. 2.

As shown in FIG. 3B, the beam generator 302 may generate two types of output optical beams. For example, and as shown in the upper output optical beam of FIG. 3B, if the coupler provides the input optical beam to the first core of the rotator fiber, the beam generator 302 may generate an output optical beam having similar characteristics to the input optical beam. As shown in the lower output optical beam of FIG. 3B, if the coupler provides the input optical beam to the second core of the rotator fiber, the beam generator 302 may generate an output optical beam having an increased size as compared to the input optical beam. As also shown in the lower output optical beam of FIG. 3B, a portion of the input optical beam may be converted by the rotator fiber to a rotary optical beam. For example, the lower output optical beam may have characteristics similar to an optical beam having a Gaussian profile as well as an optical beam having a top-hat profile. Such characteristics may result from the rotator fiber having a uniform diameter along a length of the rotator fiber, as shown in FIG. 3B, and a uniform twist rate (e.g., pitch) along the length of the rotator fiber (e.g., as shown in the rotator fiber of FIG. 1B).

As indicated above, FIGS. 3A and 3B are provided merely as examples. Other examples are contemplated and may differ from what is described with regard to FIGS. 3A and 3B.

FIGS. 4A-4D are diagrams of example implementations of cross-sections 402, 404, 406, 408 of optical fibers (e.g., rotator fibers).

Figure 4A:
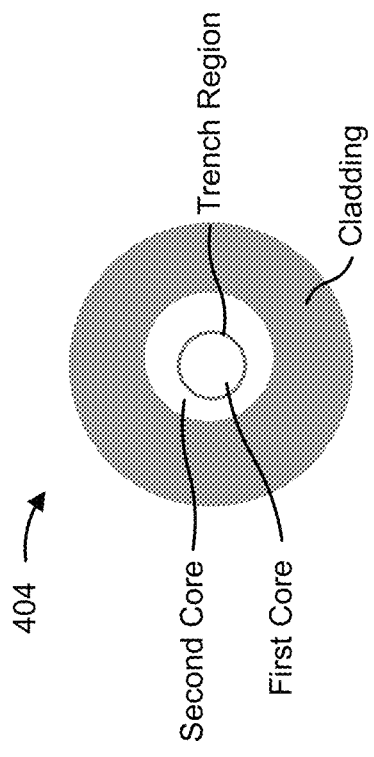
FIGS. 4A-4D are diagrams of example implementations of cross-sections of optical fibers described herein.

As shown in FIG. 4A, a cross-section 402 of a rotator fiber may include a central core located at a center of the rotator fiber and three or more cores located at off-center locations with respect to the center of the rotator fiber. In some implementations, the three cores may be located at off-center locations with respect to the center of the rotator fiber, where the off-center locations have different radial distances to the center of the optical fiber. For example, and as shown in FIG. 4A, a first core, a second core, and a third core may be located at off-center locations with respect to the center of the rotator fiber, wherein the off-center locations of the first core, the second core, and the third core have radial distances R1, R2, and R3, respectively, to the center of the optical fiber.

In some implementations, the central core may be similar to the first core described with respect to FIG. 1A, while the three cores located at off-center locations may be similar to the second core described with respect to FIG. 1A. For example, the central core may not twist about an axis of the rotator fiber (e.g., a center of the rotator fiber) along a length of the rotator fiber, and the three cores located at off-center locations may twist about the axis of the rotator fiber along a length of the rotator fiber.

Additionally, or alternatively, when an input optical beam is provided to the central core, the rotator fiber may generate an output optical beam that is similar to the input optical beam. When an input optical beam is provided to one of the three cores located at off-center locations, the rotator fiber may generate an output optical beam that is a rotary optical beam. Furthermore, each of the three cores (e.g., due to the different radial distances R1, R2, and R3 to the center of the optical fiber) may generate rotary optical beams having different characteristics (e.g., different diameters, different powers, and/or the like).

Figure 4B:
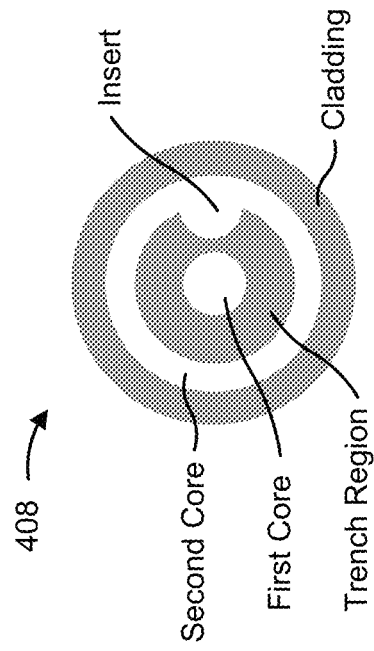

As shown in FIG. 4B, a cross-section 404 of a rotator fiber may include a first core, a second core, a trench region, and a cladding. In some implementations, and as shown in FIG. 4B, the first core may be inserted within the second core, and the trench region (e.g., a cladding low-index trench region and/or the like) may be positioned between the first core and the second core. The first core may be located at a center of the rotator fiber, and the second core may be at an off-center location with respect to the center of the rotator fiber (e.g., a geometric center of the second core may be located at an off-center location with respect to the center of the rotator fiber). As also shown in FIG. 4B, the cladding may surround the first core, the second core, and the trench region.

In some implementations, the first core may be similar to the first core described with respect to FIG. 1A and/or FIG. 3A, and the second core may be similar to the second core described with respect to FIG. 3A. As shown by the shading in FIG. 4B, the first core and the second core may have a same refractive index. In some implementations, the trench region between the first core and the second core may prevent light propagating in the first core from entering the second core and/or light propagating in the second core from entering the first core. In this way, the first core and the second core may provide two separate light propagation paths through the rotator fiber.

Additionally, or alternatively, when an input optical beam is provided to the first core, the rotator fiber may generate an output optical beam that is similar to the input optical beam. When an input optical beam is provided to the second core, the rotator fiber may generate an output optical beam that is a rotary optical beam.

Figure 4C:
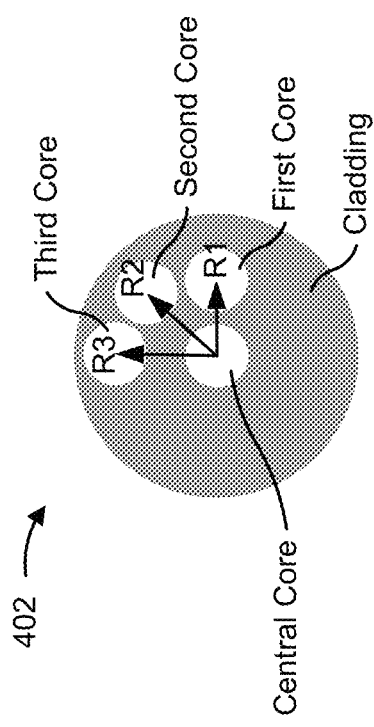

As shown in FIG. 4C, a cross-section 406 of a rotator fiber may include a first core, a second core, a trench region, a first insert (e.g., a first insert element), a second insert (e.g., a second insert element), and a cladding. In some implementations, and as shown in FIG. 4C, the first core may be inserted within the second core, and the trench region (e.g., a cladding low-index trench region and/or the like) may be positioned between the first core and the second core. The first core may be located at a center of the rotator fiber, and the second core may also be located at the center of the rotator fiber (e.g., a geometric center of the second core may be located at the center of the rotator fiber). Thus, in some implementations, the first core and the second core may be concentric. As also shown in FIG. 4C, the cladding may surround the first core, the second core, the trench region, the first insert, and the second insert.

In some implementations, the first core may be similar to the first core described with respect to FIG. 1A. As shown by the shading in FIG. 4C, the first core and the second core may have a same refractive index. In some implementations, the trench region between the first core and the second core may prevent light propagating in the first core from entering the second core and/or light propagating in the second core from entering the first core. In this way, the first core and the second core may provide two separate light propagation paths through the rotator fiber.

As shown in FIG. 4C, the first insert (e.g., a first rod-shaped insert) and the second insert (e.g., a second rod-shaped insert) may be positioned within the second core. As shown by the shading in FIG. 4C, the first insert and the second insert may have different refractive indices than a refractive index of the second core. For example, the first insert and the second insert may have a lower refractive index than the refractive index of the second core. In some implementations, the first insert and/or the second insert may be formed from a doped silica, a non-doped silica, and/or the like.

As shown in FIG. 4C, the first insert and/or the second insert may have circular cross-sectional shapes. In some implementations, the first insert and/or the second insert may have cross-sectional shapes other than circular shapes (e.g., rectangular, triangular, star-shaped, hexagonal, octagonal, and/or the like). Additionally, or alternatively, the first insert and/or the second insert may not have the same shape as each other. In some implementations, the rotator fiber may include one insert or more than two inserts (e.g., three inserts, four inserts, five inserts, and/or the like) to achieve the same function.

In some implementations, the first insert and the second insert may cause sections of the second core to be azimuthally nonuniform, and the azimuthally nonuniform sections may be at off-center locations with respect to the center of the rotator fiber. In some implementations, twisting of the cross-section 406 shown in FIG. 4C along the length of the rotator fiber may cause a beam of light inside the second core to be converted to a rotary optical beam. That is, the off-center azimuthally nonuniform sections being twisted about the axis may cause an input optical beam, launched at a first end of the rotator fiber, to be at least partially converted to a rotary optical beam at a second end of the rotator fiber. In some implementations, and in a manner similar to that described with respect to FIG. 1C, a rate of twist at which the off-center azimuthally nonuniform sections twist about the axis of the rotator fiber may increase from a first rate of twist at a first end of the rotator fiber to a second rate of twist at a second end of the rotator fiber.

Additionally, or alternatively, when an input optical beam is provided to the first core, the rotator fiber may generate an output optical beam that is similar to the input optical beam. When an input optical beam is provided to the second core, the rotator fiber may generate an output optical beam that is a rotary optical beam.

Figure 4D:
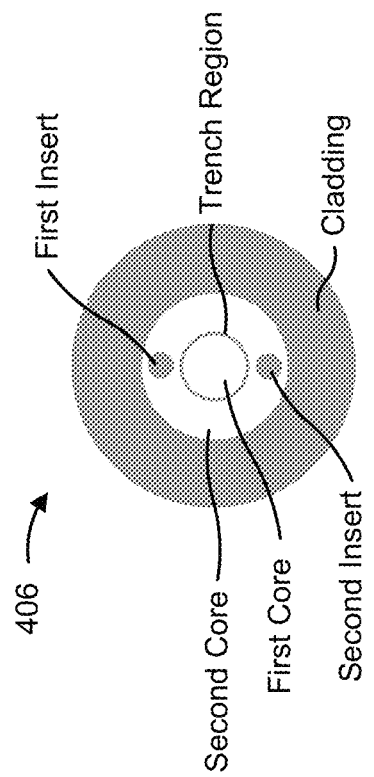

As shown in FIG. 4D, a cross-section 408 of a rotator fiber may include a first core, a second core, a trench region, an insert (e.g., an insert element), and a cladding. In some implementations, and as shown in FIG. 4D, the first core may be inserted within the second core, and the trench region (e.g., a cladding low-index trench region and/or the like) may be positioned between the first core and the second core and between the first core and the insert. The first core may be located at a center of the rotator fiber, and the second core may also be located at the center of the rotator fiber (e.g., a geometric center of the second core may be located at the center of the rotator fiber). As shown in FIG. 4D, the cladding may surround the first core, the second core, the trench region, and the insert.

In some implementations, the first core may be similar to the first core described with respect to FIG. 1A. For example, the first core may form a first guiding region for light propagating through the rotator fiber.

As shown in FIG. 4D, the insert may be inserted within the second core and the cladding. As shown by the shading in FIG. 4D, the insert may have a same refractive index as the second core. In this way, the second core and the insert may form a second guiding region within the rotator fiber.

As shown by the shading in FIG. 4D, the first core, the second core, and the insert may have a same refractive index. In some implementations, the trench region between the first guiding region (e.g., formed by the core) and the second guiding region (e.g., formed by the second core and the insert) may prevent light propagating in the first guiding region from entering the second guiding region and/or light propagating in the second guiding region from entering the first guiding region. In this way, the first guiding region and the second guiding region may provide two separate light propagation paths through the rotator fiber.

In some implementations, the insert may cause a section of the second guiding region to be azimuthally nonuniform, and the azimuthally nonuniform section may be at an off-center location with respect to the center of the rotator fiber. In some implementations, twisting of the cross-section 408 shown in FIG. 4D along the length of the rotator fiber may cause a beam of light inside the second guiding region to be converted to a rotary optical beam in a manner similar to that described with respect to FIG. 4C.

Additionally, or alternatively, the insert may be a section of the second core. For example, the second core may include an azimuthally nonuniform section formed by the insert at an off-center location with respect to the center of the rotator fiber and another section, such as a ring-shaped section as shown in FIG. 4D.

In some implementations, when an input optical beam is provided to the first guiding region (e.g., formed by the core), the rotator fiber may generate an output optical beam that is similar to the input optical beam. When an input optical beam is provided to the second guiding region (e.g., formed by the second core and the insert), the rotator fiber may generate an output optical beam that is a rotary optical beam.

As indicated above, FIGS. 4A-4D are provided merely as examples. Other examples are contemplated and may differ from what is described with regard to FIGS. 4A-4D. For example, although the cross-sections of FIGS. 4A-4D include elements and/or sections having circular shapes and/or ring shapes, other example implementations may include elements and/or sections having different and/or non-circular shapes, such as rectangular shapes, triangular shapes, star shapes, partial ring shapes, and/or the like. As another example, other example implementations may include fewer elements and/or sections as compared to the cross-sections of FIGS. 4A-4D or more elements and/or sections as compared to the cross-sections of FIGS. 4A-4D.

FIGS. 5A-5C are diagrams of example implementations of output fibers 502, 504, and 506. For example, the output fibers shown in and described with respect to FIGS. 1B, 2, and 3B may include the output fibers 502, 504, and/or 506. In some implementations, the output fibers 502, 504, and 506 may be non-rotating fibers and may include multiple guiding regions to preserve different output optical beams generated by multi-rotary fibers.

As shown in FIG. 5A, the output fiber 502 may be a step-index ring fiber and may include a central core, an inner cladding, a ring core, and an outer cladding. The inner cladding may surround the central core, and the ring core may surround the inner cladding. The outer cladding may surround the ring core. As shown in FIG. 5A, the central core, the inner cladding, the ring core, and the outer cladding may have refractive indices, $n_1$, $n_2$, $n_3$, and $n_4$, respectively, where $n_1$ is greater than $n_2$, and $n_3$ is greater than $n_2$ and $n_4$. In some implementations, $n_2$ may be greater than $n_4$. Additionally, or alternatively, $n_1$ may be equal to $n_3$. In some implementations, the output fiber 502 may include additional ring cores and/or additional cladding layers (e.g., inner claddings).

In some implementations, radial thicknesses of the central core, the inner cladding, the ring core, and/or the outer cladding may correspond to locations of cores and/or guiding regions of a rotator fiber providing light to the output fiber 502. For example, if a beam generator includes the rotator fiber having the cross-section 100 as shown in and described with respect to FIG. 1A and the output fiber 502, the central core of the output fiber 502 may have a radial thickness corresponding to a radial thickness of the first core, and the ring core of the output fiber 502 may have a radial thickness corresponding to a radial thickness of the second core. Additionally, or alternatively, the radial thickness of the inner cladding of the output fiber 502 may correspond to a radial distance between edges of the first core and the second core. In this way, light propagating in the first core and the second core of the rotator fiber may enter and propagate through the central core and ring core, respectively, of the output fiber 502. Additionally, or alternatively, the inner cladding may prevent light propagating in the central core from entering the ring core and may prevent light propagating in the ring core from entering the central core. Thus, in some implementations, the output fiber 502 may include a first guiding region to receive an optical beam from a rotator fiber's first guiding region and/or first core and a second guiding region to receive another optical beam (e.g., a rotary optical beam) from the rotator fiber's second guiding region and/or second core.

In some implementations, the output fiber 502 may receive, from a rotator fiber, an input optical beam (e.g., a rotary optical beam) that is azimuthally asymmetric (e.g., rotationally asymmetric). The output fiber 502, by propagating the input optical beam along a length of the output fiber 502, may create an azimuthally symmetric (e.g., rotationally symmetric) output optical beam (e.g. due to incoherent averaging of modes).

As shown in FIG. 5B, the output fiber 504 may be a pedestal fiber and may include a central core, a pedestal, and an outer cladding. The pedestal may surround the central core, and the outer cladding may surround the pedestal. As shown in FIG. 5B, the central core, the pedestal, and the outer cladding may have refractive indices, $n_1$, $n_2$, and $n_3$, respectively, where $n_1$ is greater than $n_2$, and $n_2$ is greater than $n_3$. In some implementations, the output fiber 504 may include additional pedestal layers between the pedestal and the outer cladding, where refractive indices monotonically decrease from the central core outward to the outer cladding.

In some implementations, radial thicknesses of the central core, the pedestal, and/or the outer cladding may correspond to locations of cores and/or guiding regions of a rotator fiber providing light to the output fiber 504 in a manner similar to that described herein with respect to FIG. 5A and output fiber 502. Additionally, or alternatively, the output fiber 504 may create an azimuthally symmetric output optical beam from an azimuthally asymmetric input optical beam in a manner similar to that described herein with respect to FIG. 5A and output fiber 502.

As shown in FIG. 5C, the output fiber 506 may be a graded-index fiber and may include a graded-index core and an outer cladding, where the outer cladding surrounds the graded-index core. In some implementations, the graded-index core may have a monotonically decreasing graded-index profile, such as a parabolic or near-parabolic index profile, which may correspond to a pedestal fiber having an infinite number of closely-spaced pedestals. Additionally, or alternatively, a strength of the graded-index profile may be selected to correspond to types of output optical beams from a rotary optical fiber in radial position and angular momentum. For example, the strength of the graded-index profile may be selected to maintain the size of a beam leaving a first guiding region of a rotator fiber, a second guiding region of a rotator fiber, and/or the like. In some implementations, the strength of the graded-index profile may be selected to maintain a particular beam size for different input beams based on size and angular momentum (e.g., the graded-index fiber may be mode-matched to a rotator fiber and/or may be averaged between mode-matched best cases for a first guiding region and a second guiding region. Additionally, or alternatively, the output fiber 506 may create an azimuthally symmetric output optical beam from an azimuthally asymmetric input optical beam in a manner similar to that described herein with respect to FIG. 5A and output fiber 502.

As indicated above, FIGS. 5A-5C are provided merely as examples. Other examples are contemplated and may differ from what is described with regard to FIGS. 5A-5C. For example, an output fiber may include combinations of one or more elements and/or sections of output fibers 502, 504, and/or 506.

FIG. 6 is a flow chart of an example process 600 for generating rotary optical beams. In some implementations, one or more process blocks of FIG. 6 may be performed by an optical fiber (e.g., a rotator fiber having a cross-section as shown in and described with respect to FIGS. 1A, 3A, 4A, 4B, 4C, and/or 4D, and/or the like). In some implementations, one or more process blocks of FIG. 6 may be performed by another device or a group of devices separate from or including the optical fiber, such as a beam generator (e.g., beam generator 102, beam generator 200, beam generator 302, and/or the like), a coupler (e.g., a coupler as shown in and described with respect to FIGS. 1B, 2, and/or 3B, and/or the like), an output fiber (e.g., an output fiber as shown in and described with respect to FIGS. 1B, 2, 3B, 5A, 5B, and/or 5C, and/or the like), and/or the like.

As shown in FIG. 6, process 600 may include receiving an input optical beam at a first end of an optical fiber, wherein the optical fiber comprises a first core, a second core, and a cladding surrounding the first core and the second core, wherein at least one of: the second core is at an off-center location with respect to a center of the optical fiber, or the second core comprises an azimuthally nonuniform section at the off-center location with respect to the center of the optical fiber, and wherein the second core twists about an axis of the optical fiber along a length of the optical fiber (block 610). For example, the optical fiber (e.g., a rotator fiber) may receive an input optical beam at a first end of the optical fiber, as described above. In some implementations, the optical fiber comprises a first core, a second core, and a cladding surrounding the first core and the second core. In some implementations, at least one of the second core is at an off-center location with respect to a center of the optical fiber, or the second core comprises an azimuthally nonuniform section at the off-center location with respect to the center of the optical fiber. In some implementations, the second core twists about an axis of the optical fiber along a length of the optical fiber.

As further shown in FIG. 6, process 600 may include at least partially converting an input optical beam received by the second core to a rotary optical beam, wherein the input optical beam is at least partially converted to the rotary optical beam as a result of the second core being twisted about the axis (block 620). For example, the optical fiber (e.g., a rotator fiber) may at least partially convert an input optical beam received by the second core to a rotary optical beam, as described above. In some implementations, the input optical beam is at least partially converted to the rotary optical beam as a result of the second core being twisted about the axis.

As further shown in FIG. 6, process 600 may include outputting the rotary optical beam (block 630). For example, the optical fiber (e.g., a rotator fiber) may output the rotary optical beam, as described above.

Process 600 may include additional implementations, such as any single implementation or any combination of implementations described below and/or in connection with one or more other processes described elsewhere herein.

In a first implementation, process 600 includes providing the input optical beam to at least one of the first core or the second core at the first end of the optical fiber. For example, a coupler may provide the input optical beam to at least one of the first core or the second core at the first end of the optical fiber, as described above.

In a second implementation, alone or in combination with the first implementation, process 600 includes receiving the rotary optical beam, wherein the rotary optical beam is not rotationally symmetric, and outputting, based on the rotary optical beam, an optical output, wherein the optical output is azimuthally symmetric. For example, an output fiber may receive the rotary optical beam, wherein the rotary optical beam is not rotationally symmetric, and may output, based on the rotary optical beam, the optical output, wherein the optical output is azimuthally symmetric.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical fiber, comprising:
   a first core;
   a second core,
      wherein at least one of:
         the second core is at a first off-center location with respect to a center of the optical fiber, or
         the second core comprises an azimuthally nonuniform section at a second off-center location with respect to the center of the optical fiber,
      wherein the first core is located at a center of the optical fiber,
      wherein the second core twists about an axis of the optical fiber along a length of the optical fiber, and
      wherein the second core is twisted about the axis is to cause at least a portion of an optical beam, launched into the second core at a first end of the optical fiber, to be at least partially converted to a rotary optical beam at a second end of the optical fiber,
      wherein the first core is to cause another portion of the optical beam, or another optical beam, launched into the first core at the first end of the optical fiber, to be output at the second end of the optical fiber, and
      wherein the other portion of the optical beam, or the other optical beam, is not converted to a rotary optical beam at the second end of the optical fiber; and
   a cladding surrounding the first core and the second core.

2. The optical fiber of claim 1, wherein a rate of twist, at which the second core twists about the axis, increases from a first rate of twist at the first end of the optical fiber to a second rate of twist at the second end of the optical fiber.

3. The optical fiber of claim 1, wherein the first core is at a third off-center location with respect to the center of the optical fiber,
   wherein the third off-center location is different from the first off-center location when the second core is at the first off-center location,
   wherein the third off-center location is different from the second off-center location when the second core comprises the azimuthally nonuniform section at the second off-center location,
   wherein the first core twists about the axis of the optical fiber along the length of the optical fiber, and
   wherein the first core is twisted about the axis is to cause the other portion of the optical beam, or the other optical beam, to be at least partially converted to a rotary optical beam at the second end of the optical fiber.

4. The optical fiber of claim 3, wherein the first off-center location and the third off-center location have different radial distances to the center of the optical fiber when the second core is at the first off-center location, and
   wherein the second off-center location and the third off-center location have different radial distances to the center of the optical fiber when the second core comprises the azimuthally nonuniform section at the second off-center location.

5. The optical fiber of claim 1, wherein the first core is inserted within the second core.

6. The optical fiber of claim 1, wherein the first core is inserted within the second core and a cladding low-index trench region is positioned between the first core and the second core.

7. The optical fiber of claim 1, further comprising one or more other cores at other off-center locations with respect to the center of the optical fiber,
   wherein the one or more other cores twist about the axis of the optical fiber along the length of the optical fiber, and
   wherein the one or more other cores are twisted about the axis is to cause an optical beam, launched into one of the one or more other cores at the first end of the optical fiber, to be at least partially converted to a rotary optical beam at the second end of the optical fiber.

8. The optical fiber of claim 1, wherein the first core and the second core have different refractive indices.

9. The optical fiber of claim 1, wherein the first core has a first cross-section,
   wherein the second core has a second cross-section, and
   wherein at least one of:
      the first cross-section and the second cross-section have different shapes; or
      the first cross-section and the second cross-section have different sizes.

10. The optical fiber of claim 1, wherein a cross-sectional size of the optical fiber increases along a portion of the length of the optical fiber in a direction from the first end of the optical fiber toward the second end of the optical fiber.

11. The optical fiber of claim 1, wherein the second core comprises:
    the azimuthally nonuniform section at the second off-center location with respect to the center of the optical fiber; and
    another section.

12. The optical fiber of claim 11, wherein the azimuthally nonuniform section is an insert element inserted within the other section.

13. The optical fiber of claim 12, wherein the insert element is formed from a doped silica or a non-doped silica.

14. The optical fiber of claim 11, wherein the azimuthally nonuniform section has a first refractive index,
    wherein the other section has a second refractive index, and
    wherein the first refractive index is different from the second refractive index.

15. The optical fiber of claim 11, wherein the other section is a first section,
    wherein the second core comprises a second section that is azimuthally nonuniform, and
    wherein the second section is at another off-center location with respect to the center of the optical fiber.

16. The optical fiber of claim 11, wherein the azimuthally nonuniform section is an insert element inserted within the other section and the cladding.

17. The optical fiber of claim 11, wherein the first core and the second core are concentric.

18. A beam generator, comprising:
an optical fiber comprising:
- a first core;
- a second core,
  - wherein at least one of:
    - the second core is at an off-center location with respect to a center of the optical fiber, or
    - the second core comprises an azimuthally nonuniform section at the off-center location with respect to the center of the optical fiber,
  - wherein the first core is inserted within the second core and a cladding low-index trench region is positioned between the first core and the second core,
  - wherein the second core twists about an axis of the optical fiber along a length of the optical fiber,
  - wherein the second core is twisted about the axis is to cause at least a portion of an optical beam, launched into the second core at a first end of the optical fiber, to be at least partially converted to a rotary optical beam at a second end of the optical fiber, and
  - wherein the first core is to cause another portion of the optical beam, or another optical beam, launched into the first core at the first end of the optical fiber, to be output at the second end of the optical fiber, and
- a cladding surrounding the first core and the second core;
- a coupler to provide, at the first end of the optical fiber, an input optical beam to at least one of the first core of the optical fiber or the second core of the optical fiber; and
- an output fiber to receive, from the second end of the optical fiber, the rotary optical beam and to generate, based on the rotary optical beam, an optical output.

19. The beam generator of claim 18, wherein the output fiber comprises:
- a first guiding region to receive the optical beam from the first core of the optical fiber; and
- a second guiding region to receive the rotary optical beam from the second core of the optical fiber.

20. The beam generator of claim 18, wherein the rotary optical beam is not rotationally symmetric, and
- wherein the optical output, generated by the output fiber based on the rotary optical beam, is azimuthally symmetric.

21. The beam generator of claim 18, wherein the output fiber comprises at least one of:
- a step-index ring fiber,
- a pedestal fiber, or
- a graded-index fiber.

22. A method, comprising:
- receiving, by an optical fiber, an input optical beam at a first end of the optical fiber,
  - wherein the optical fiber comprises a first core, a second core, and a cladding surrounding the first core and the second core,
    - wherein at least one of: the second core is at an off-center location with respect to a center of the optical fiber, or the second core comprises an azimuthally nonuniform section at the off-center location with respect to the center of the optical fiber, and
    - wherein the second core twists about an axis of the optical fiber along a length of the optical fiber;
- at least partially converting, by the optical fiber, at least a portion of an input optical beam received by the second core to a rotary optical beam,
  - wherein the input optical beam is at least partially converted to the rotary optical beam as a result of the second core being twisted about the axis;
- causing another portion of the input optical beam, or another input optical beam, launched into the first core at the first end of the optical fiber, to be output at the second end of the optical fiber;
- outputting, by the optical fiber, the rotary optical beam;
- receiving, by an output fiber, the rotary optical beam,
  - wherein the rotary optical beam is not rotationally symmetric; and
- outputting, by the output fiber and based on the rotary optical beam, an optical output,
  - wherein the optical output is azimuthally symmetric.

23. The method of claim 22, further comprising:
- providing, by a coupler and to the optical fiber, the input optical beam to at least one of the first core or the second core at the first end of the optical fiber.

24. The beam generator of claim 18, wherein the second core comprises:
- the azimuthally nonuniform section at a second off-center location with respect to the center of the optical fiber; and
- another section.

* * * * *